UNITED STATES PATENT OFFICE.

BRUCE FORD, OF PHILADELPHIA, PENNSYLVANIA.

MEANS FOR HOLDING CELLS IN A BATTERY-BOX.

1,142,245.  Specification of Letters Patent.  Patented June 8, 1915.

Application filed April 12, 1913. Serial No. 760,600.

*To all whom it may concern:*

Be it known that I, BRUCE FORD, a citizen of the United States, and a resident of Philadelphia, in the county of Philadelphia and State of Pennsylvania, have invented certain new and useful Means for Holding Cells in Battery-Boxes, of which the following is a specification.

The principal objects of the present invention are to provide for tightly holding or packing cells in a battery box so that they are held immovable therein in all directions, and to provide drainage for protecting some of the means that are employed in the accomplishment of the first named object.

The invention will be claimed at the end hereof, but will be first described in connection with the embodiment of it chosen for illustration in the accompanying drawings, in which—

Figure 1:
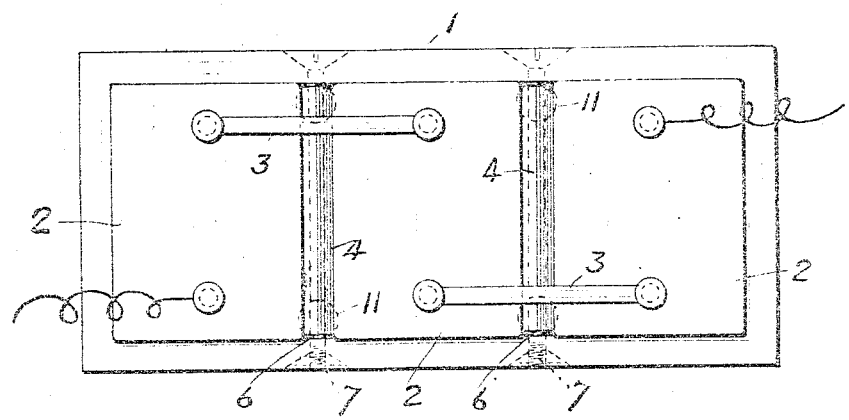
Figure 2:
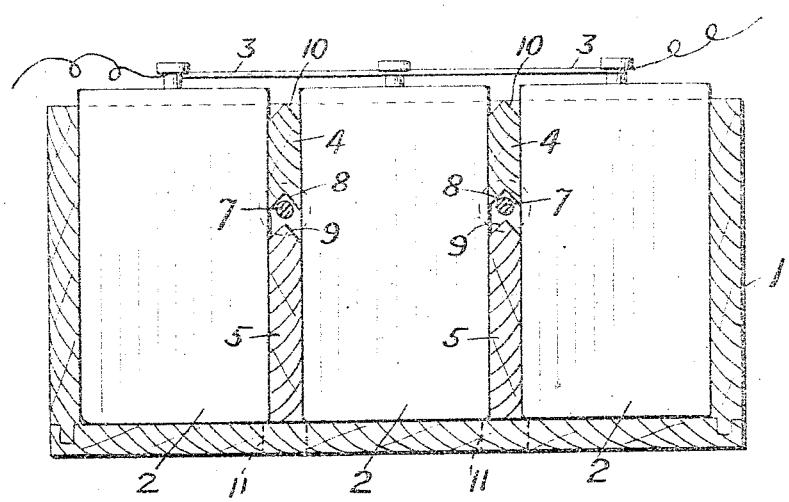

Figure 1, is a top or plan view of a battery box and its cells constructed and arranged according to the present invention, and Fig. 2, is a view of the same principally in vertical section.

In the drawings 1 is a battery box which as usual consists of a bottom and two sides and two ends and is open at the top.

2, are the cells and they may consist of rubber jars and they contain the usual and essential parts of the battery.

3, are terminal connections.

The cells are placed in the box 1 which may be made of wood and the spacing or packing boards 4 and 5 are placed in between the cells and operate something after the fashion of wedges to pack the cells tightly endwise of the box. As shown in the drawing these spacing boards are of such length that there is at each of their ends a clearance 6.

7, are through bolts that are alined with the spacing boards and extend through the side walls of the battery box, so that when these bolts are drawn up the sides of the box are drawn or sprung inward and thus hold the cells tightly cross-wise of the box. At the same time the packing boards 4, become tight by the spreading of the jar walls endwise as the sidewise pressure is put on them by screwing up the nuts. In this way the cells are very tightly packed in the box and are held firmly therein, all of which is advantageous as will be readily understood by those skilled in the art.

The boards 4 and 5 may be spaced apart so as to afford room for the through bolts and the adjoining edges of the boards may be provided with an upwardly extending groove 8 and an upwardly extending tongue 9, which afford drainage in respect to the through bolts because if acid spills over it runs down the board 4 and drops off at the lower edges of the groove clear of the bolt 7 and the sloping walls of the tongue on the board 9 operate to lead liquid away from the center of the boards 5. The top of the boards 4 may be tongued or beveled as at 10 also for the purpose of affording drainage.

11 are drainage openings through the bottom of the box.

It will be obvious to those skilled in the art to which the invention relates that modifications may be made in details without departing from the spirit of the invention, but

Having thus described the nature and objects of my invention what I claim as new and desire to secure by Letters Patent is:

1. Means for holding cells in a battery box which comprise the combination of cells in the box, transversely arranged spacing boards between the cells and having clearance at their ends, and through bolts alined with the spacing boards and adapted to hold the side walls of the box tight up to the cells and cell walls tight up to the spacing boards, substantially as described.

2. Means for holding cells in a battery box which comprise the combination of cells in the box, transversely arranged spacing boards in superposed relation between the cells with space between the boards, and a through bolt arranged in the space between the boards and adapted to hold the side walls of the box up to the cells and cell walls up to the spacing boards, substantially as described.

3. Means for holding cells in a battery box which comprise the combination of cells in the box, transverse spacing boards packed between the cells and having respectively upwardly projecting tongues and grooves in superposed relation with space between, and a through bolt arranged in the space between the boards and adapted to hold the sides of the box against the cells and cell walls against the spacing boards, substantially as described.

In testimony whereof I have hereunto signed my name.

BRUCE FORD.

Witnesses:
 GEO. M. HOWARD,
 EDGAR L. LONGAKER.